US007103739B2

(12) United States Patent
Keohane et al.

(10) Patent No.: US 7,103,739 B2
(45) Date of Patent: Sep. 5, 2006

(54) METHOD AND APPARATUS FOR PROVIDING HARDWARE AWARE LOGICAL VOLUME MIRRORS

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 10/682,411

(22) Filed: Oct. 9, 2003

(65) Prior Publication Data

US 2005/0080991 A1    Apr. 14, 2005

(51) Int. Cl.
*G06F 12/00*    (2006.01)
(52) U.S. Cl. .................... 711/162; 711/161; 707/204
(58) Field of Classification Search ........ 711/161–162; 707/200–207; 714/1–7
See application file for complete search history.

(56) References Cited

U.S. PATENT DOCUMENTS

| 5,185,884 | A | | 2/1993 | Martin et al. ............ 360/73.03 |
| 5,237,466 | A | | 8/1993 | Glaser et al. ................. 714/6 |
| 5,619,690 | A | * | 4/1997 | Matsumani et al. ........ 707/200 |
| 5,937,428 | A | * | 8/1999 | Jantz ........................... 711/114 |
| 6,415,373 | B1 | * | 7/2002 | Peters et al. ................. 711/167 |
| 6,442,650 | B1 | * | 8/2002 | Bachmat et al. ............. 711/114 |
| 6,697,924 | B1 | * | 2/2004 | Swank ......................... 711/163 |
| 2001/0023463 | A1 | * | 9/2001 | Yamamoto et al. ............ 710/6 |
| 2002/0174315 | A1 | * | 11/2002 | Yamamoto .................. 711/170 |
| 2004/0034751 | A1 | * | 2/2004 | Horn et al. .................. 711/158 |

FOREIGN PATENT DOCUMENTS

WO        WO 01/13235        2/2001

* cited by examiner

*Primary Examiner*—Nasser Moazzami
(74) *Attorney, Agent, or Firm*—Duke W. Yee; Marilyn Smith Dawkins; Gerald H. Glanzman

(57) ABSTRACT

A method and apparatus for providing hardware aware logical volume mirrors are provided. In particular, the an improved logical volume system and method are provided in which a mirroring device driver is provided that selects a physical storage device from which data is to be read based on information obtained regarding the physical devices used in the mirror of the data. The mirroring device driver may be part of a logical volume device driver (LVDD), such that a modified LVDD is provided, or may work in concert with the logical volume device driver to achieve the purposes of the present invention. The information regarding the physical devices used in the mirror may include characteristic data of physical storage devices (e.g., whether a write cache is used, whether a read-ahead cache is used, RPM speed, connector type, etc.) and may also include operational history data. One or more rules are applied to this information to determine which physical storage device is an optimum storage device from which data is to be accessed.

27 Claims, 4 Drawing Sheets

METHOD AND APPARATUS FOR PROVIDING HARDWARE AWARE LOGICAL VOLUME MIRRORS

BACKGROUND OF THE INVENTION

1. Technical Field

The present invention is directed to an improved computing system involving access to data in a storage system that makes use of logical volume mirroring. More specifically, the present invention is directed to a method and apparatus for improving data reads from a logical volume mirror by providing information regarding the physical devices associated with the mirrors and determining what devices to read data from based on the information regarding the physical devices.

2. Description of Related Art

A mirror is a duplicate on one or more physical storage devices of some or all of the contents of another physical storage device or devices. When a mirror is employed in a computer system, requests to access the mirrored data may be processed by either the original storage device storing the data or by the mirror. By distributing the requests over two or more sets of physical storage devices, the workload of any one physical storage device is diminished.

Data mirroring may be implemented in hardware or software. In hardware mirroring, a specialized storage system, typically a Redundant Array of Independent Disks (RAID) system, will perform the management of the data in terms of keeping track of the read and write requests. That is, the request is transparent to the software running on the computing system.

Software mirroring is the use of the operating system to manage requests down to separate physical disks. This requires software to be aware of the location of the disks in terms of how they are connected to the computing system. Software mirroring is usually performed by a system device driver as it needs to interrupt the operating system to perform request processing.

Usually, hardware mirroring is more efficient than software mirroring. There are some exceptions to this statement. First, since hardware mirroring is usually specific to a disk system, there is usually a data stream bottleneck at the connection point between the computer and the storage system, i.e. all read and write requests must go serially down the physical connection to the hardware storage system. Software mirroring on the other hand, usually has multiple disk drives attached to multiple data bus connections. Thus, data requests can be sent and received in parallel. Second, hardware mirroring ties users to a set of hardware. If the user commits to a hardware mirror, then non-hardware-mirroring-capable disk drives cannot be used for mirroring since hardware based mirroring requires that the mirroring either be enabled or not. Software mirroring allows the use of any disk drive to be used as a software mirror.

However, software mirroring has one major flaw, it must treat all the disk drives in the same manner since it may be used with any type of disk drive. This does not allow software mirroring to take advantage of the specific advantages of the characteristics of different physical devices. Thus, it would be beneficial to have a method and apparatus for performing input/output operations on a mirrored storage system such that the particular characteristics of different physical devices are taken into account in determining with which physical devices to perform the input/output operation.

SUMMARY OF THE INVENTION

The present invention provides a method and apparatus for providing hardware aware logical volume mirrors. In particular, the present invention provides an improved logical volume system and method in which a mirroring device driver is provided that selects a physical storage device from which data is to be read based on information obtained regarding the physical devices used in the mirror of the data. The mirroring device driver may be part of a logical volume device driver (LVDD), such that a modified LVDD is provided, or may work in concert with the logical volume device driver to achieve the purposes of the present invention.

The information regarding the physical devices used in the mirror may include characteristic data of physical storage devices (e.g., whether a write cache is used, whether a read-ahead cache is used, RPM speed, connector type, etc.) and may also include operational history data. One or more rules are applied to this information to determine which physical storage device is an optimum storage device from which data is to be accessed.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
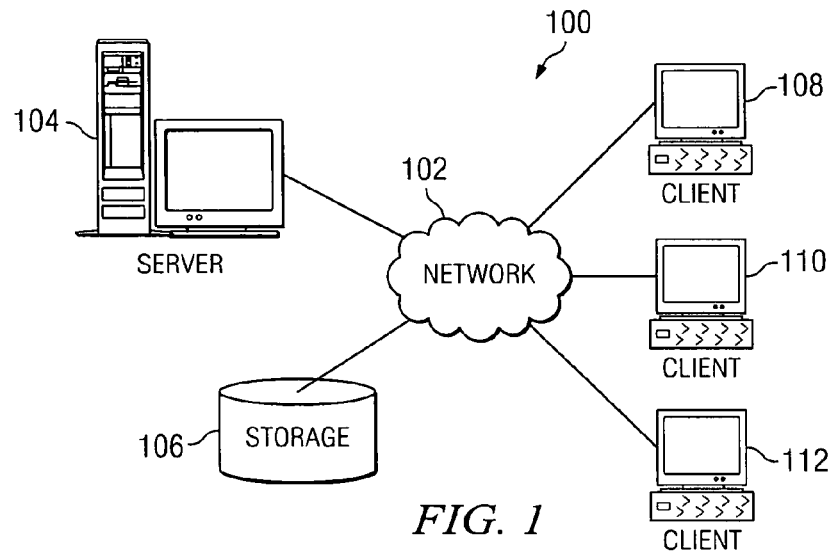
FIG. 1 is an exemplary diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
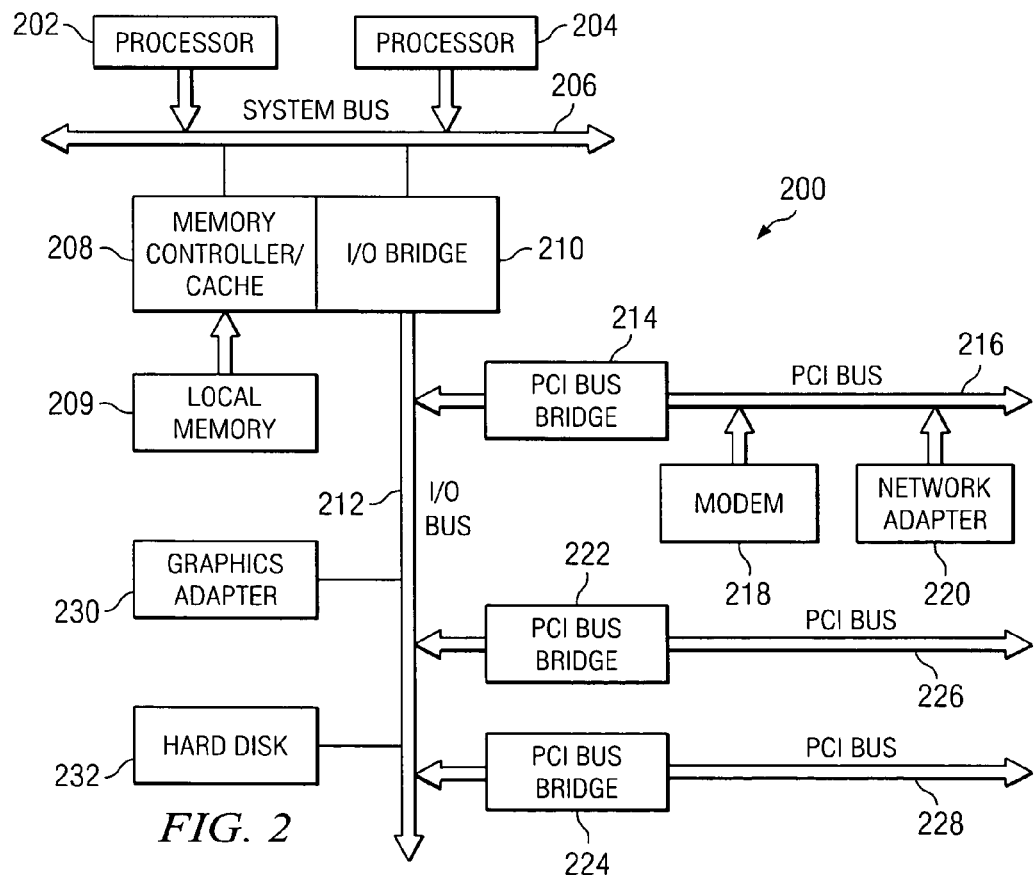
FIG. 2 is an exemplary diagram of a server data processing device in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
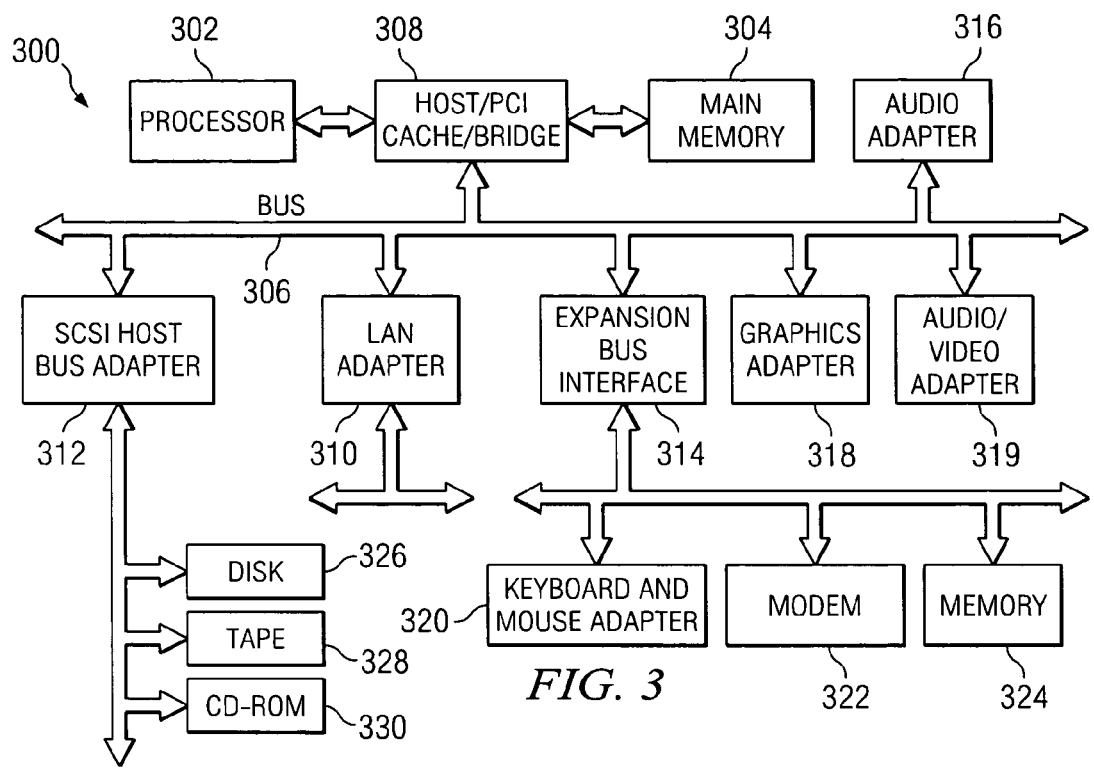
FIG. 3 is an exemplary diagram of a client or stand-alone data processing device in which the present invention may be implemented.

With reference now to FIG. 3, a block diagram illustrating a data processing system is depicted in which the present invention may be implemented. Data processing system 300 is an example of a client computer or stand-alone computing device in which the present invention may be implemented. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Before providing a detailed description of the mechanisms of the present invention, a brief description of one exemplary data mirroring mechanism with which the present invention may be utilized will be provided in order to provide a context for the description of the present invention. An example of a similar data mirroring system and methodology may be found, for example, in commonly owned and co-pending U.S. patent application Ser. No. 09/810,025, entitled "Method of Automatically Generating and Disbanding Data Mirrors According to Workload Conditions," filed on Mar. 15, 2001, and which is hereby incorporated by reference.

Figure 4:
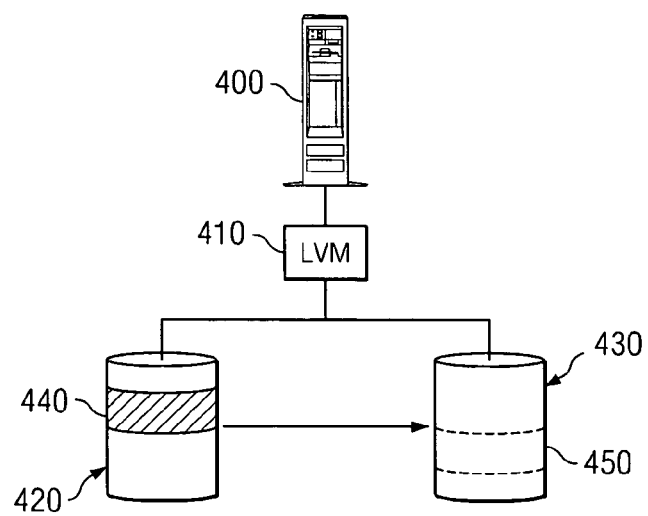
FIG. 4 is an exemplary diagram depicting the structure and operation of an exemplary data mirroring system.

FIG. 4 is a diagram depicting the structure and operation of an exemplary data mirroring system. As shown in FIG. 4, Central Processing Unit (CPU) 400 executes a logical volume manager (LVM) 410 to operate two storage volumes 420, 430. Storage volumes 420, 430 may be made up of disk storage, tape storage, or any other read/write storage medium. Moreover, storage volumes 420, 430 need not be physical devices and may in fact be "logical volumes." Logical volumes are portions of physical storage volumes that are treated by operating system software as if they were separate physical volumes.

As illustrated, storage volume 420 contains a section of data 440 that is to be mirrored. The LVM 410 automatically copies the information from section 440 to an area of unused storage space 450 on volume 430 to create a "mirror" of section 440. Such copying, which is directed by logical volume manager 410 may be performed by CPU 400 or by a separate controller device (not shown). Using a separate controller reduces the workload of CPU 400. Area 450 may either be an area specially reserved for use as a mirror, or it may be simply a block of unreserved empty space.

Once the data is copied, when CPU 400 requests that data from section 440 be read, LVM 410 can retrieve the data from either section 440 or the mirror, section 450. By distributing requests between section 440 on volume 420 and section 450 on volume 430, LVM 410 can ensure that neither volume is overloaded with requests, and thus all requests will be processed in a timely fashion.

Figure 5:
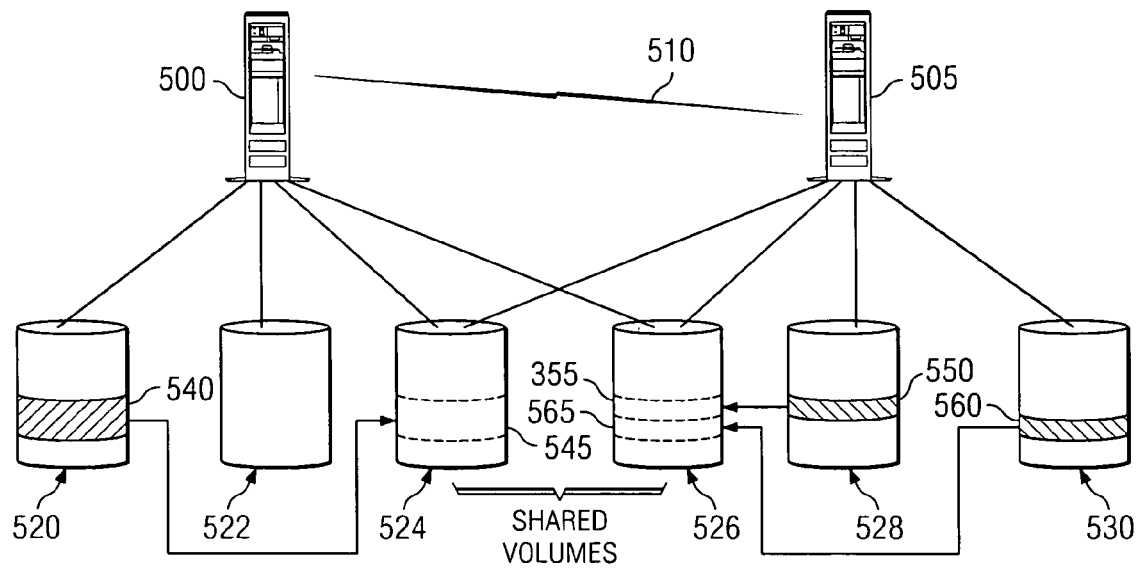
FIG. 5 is an exemplary diagram depicting how volumes used for mirroring may be shared between two CPUs in communication with one another, in an embodiment of the present invention.

FIG. 5 demonstrates how volumes used for mirroring may be shared between two CPUs 500, 505 in communication 510 with one another, in an embodiment of the present invention. As shown in FIG. 5, CPU 500 has access to volumes 520, 522, 524, and 526, while CPU 505 has access to volumes 524, 526, 528, and 530. Volumes 524 and 526 are shared between CPU 500 and CPU 505. Hot spot 540 is mirrored in area 545 of volume 524 and hot spots 550 and 560 are mirrored in areas 555 and 565 of volume 526, respectively. Alternatively, or in addition, the hot spot 540 may be mirrored to volume 526 and hot spots 550–560 may be mirrored to volume 524. Thus, both CPUs 500 and 505 may use either or both of the shared volumes 524 and 526 to mirror data from the other storage volumes 528–530. Furthermore, CPU 500 may use either or both of storage volumes 520 and 522 to mirror data stored in shared volumes 524 and 526. Similarly, CPU 505 may use either or both of storage volumes 528 and 530 to mirror data stored in shared volumes 524 and 526.

This shared volume arrangement is common where the shared volumes are used as "hot spares." Hot spares are storage volumes that are reserved for use when a failure in another storage volume occurs. When a failure occurs, a hot spare is substituted for the failing device. Using hot spare volumes for automatic mirroring, in accordance with the present invention, can be advantageous, particularly under circumstances that necessitate the mirroring of an entire volume of information. Since hot spare volumes are usually kept empty, it is usually convenient to mirror information to a hot spare. When a hot spare volume being used as a mirror is needed to replace a failed volume, the failed volume can be easily decommissioned.

As touched upon above, the logical volume manager (LVM) controls disk resources by mapping data between a more simple and flexible logical view of storage space and the actual physical disks. The LVM does this using a layer of device driver code, referred to as a logical volume device driver (LVDD), that runs above traditional storage device drivers. The LVDD is a pseudo-device driver that manages and processes all I/O to the storage devices of a logical storage system.

In the context of the above logical volume storage system, the present invention provides an improved logical volume storage system and method in which a mirroring device driver is provided that selects a physical storage device from which data is to be read based on information obtained regarding the physical devices used in the mirror of the data. The mirroring device driver may be part of a logical volume device driver, such that a modified LVDD is provided, or may work in concert with the logical volume device driver to achieve the purposes of the present invention.

Figure 6:
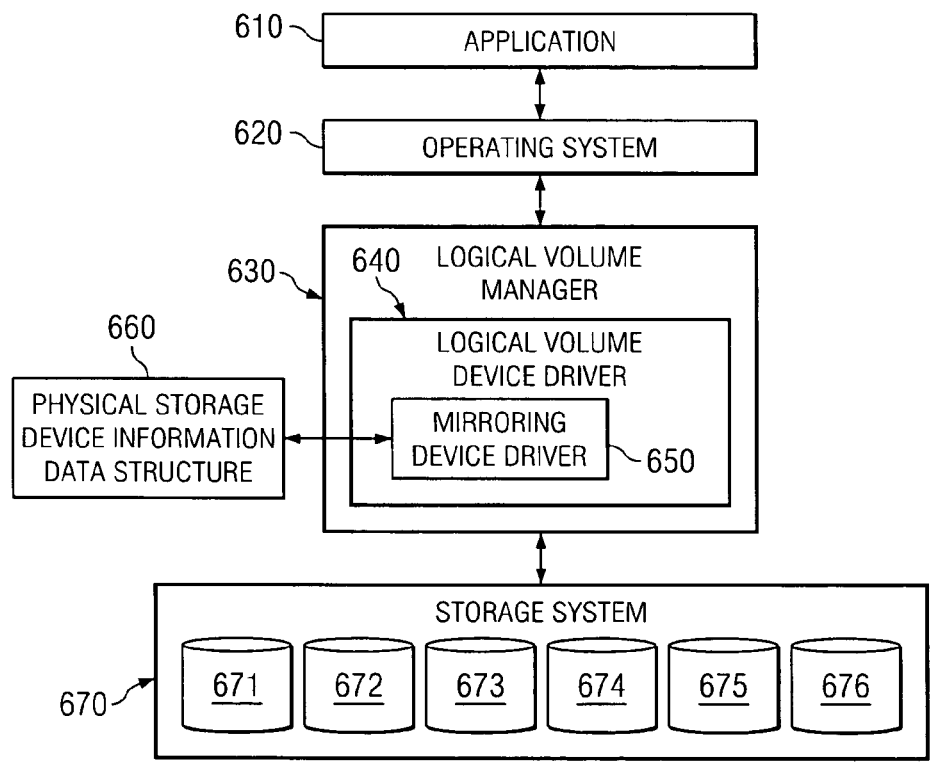
FIG. 6 is an exemplary diagram of the primary operational components of the present invention.

FIG. 6 provides an exemplary block diagram illustrating the primary operational components of the present invention. As shown in FIG. 6, an application 610 may submit input/output (I/O) operations for accessing data stored on the storage system 670 to the operating system 620. The storage system 670 may include a plurality of physical storage devices 671–676 that may be of the same of different types, i.e. may have the same or difference characteristics. Some of the physical storage devices 671–676 may provide mirrors for logical volumes stored on other physical storage devices.

With the present invention, the operating system 620 may receive the I/O operation from the application 610, may perform some processing based on the I/O operation, as is known in the art, and may then submit a command to the logical volume manager 630 to perform the I/O operation. The logical volume manager 630, as discussed previously, is responsible for managing and processing I/O operations directed to the logical volumes stored on the storage system 670.

The logical volume manager 630, in response to receiving the command to perform the I/O operation, processes the I/O operation by using a mirroring device driver 650 to determine which storage devices 671–676 provide mirrors for the logical volume to which the I/O operation is directed. Once the mirror storage devices are identified, the mirroring device driver 650 determines which of the physical storage devices 671–676 of the storage system 670 to access the data from, or write the data to, based on information obtained regarding the physical storage devices' characteristics and/or operational history information, and information regarding the type of I/O operation being performed.

Because mirroring has a requirement that all the mirrors must be identical, all write requests to the one mirror must be performed in all of the mirrors. There is no mirror that can be "skipped" because to do so would cause data corruption.

Therefore, the mechanisms of the present invention are primarily directed to improving read I/O operations on mirrored logical volumes. In mirror read I/O operations, since all of the mirrors have been guaranteed to be identical, the logical volume device driver 640 may read data from any of multiple possible data sources. Regardless of which mirror the data is read from, the data will be the same. The present invention provides a mechanism for selecting the optimum source from which to read the data based on information obtained about the possible sources and information regarding the type of read I/O operation being performed.

The mirroring device driver 650 performs the functions of selecting the mirror physical storage device 671–676 from which to read the data identified in a read I/O operation. The mirroring device driver 650 determines which mirror physical storage device 671–676 to read the data from for the I/O operation by retrieving physical storage device information from a physical storage device information data structure 660. The physical storage device information data structure 660 may be stored on a storage device in the storage system 670, in a memory that is part of the storage system 670, a memory associated with the logical volume manager 630 or operating system 620, such as system memory, or the like.

The physical storage device information stored in the physical storage device information data structure 660, in a preferred embodiment, stores characteristic information regarding each of the physical storage devices 671–676 of the storage system 670 which store logical volumes that are managed by the logical volume manager 630. This characteristic data may include, for example, whether or not the physical storage device includes a write cache, a read-ahead cache, the RPM speed of the physical storage device, a connection type (e.g., USB, firewire, fibrechannel, etc.), and the like. In short, any characteristic information that may distinguish the physical storage device from other physical storage devices may be included in the characteristic data that is stored in the physical storage device information data structure.

In addition to the physical storage device characteristic data, the physical storage device information may further include operational history data for each of the physical storage devices 671–676 that store data of a logical volume managed by the logical volume manager 630. This operational history data may include, for example, an amount of time in service of a corresponding physical storage device, a failure history of the physical storage device, and the like. The amount of time in service may be determined, for example, based on a timestamp associated with a first time that the physical storage device was detected by the storage system as being present and a current time. The failure history may be provided as a log in which log entries are automatically added each time a failure of the physical storage devices is detected by the logical volume manager 630.

The physical storage device characteristic information and operational history information may be obtained automatically, may be entered manually by a user, or a combination of both automatic and manual entry. For example, during an initiation of a mirrored logical volume, the physical storage devices associated with the mirrored logical volume may be queried to obtained characteristic information. Each physical storage device stores information about itself in a predefined area on the storage device. This information may include whether a write cache is included in the physical storage device, whether a read-ahead cache is included in the physical storage device, an average RPM speed for the physical storage device, and the like. This information may be reported back to the logical volume manager 630 upon receiving the query and the logical volume manager 630 may write the characteristic information into a data structure associated with the logical volume, along with an identifier of the storage device, in the physical storage device information data structure 660.

Similarly, operational history data may be obtained automatically by logging a timestamp of a first time that the storage system 670 detects the presence of a physical storage device 671–676. This timestamp may be stored in the physical storage device information data structure 660, in association with a physical storage device identifier, and may be used along with a current time to determine a "time in service" of the physical storage device. Likewise, as failures of a physical storage device are detected by the logical volume manager 630, log entries of these failures may be stored in the physical storage device information data structure 660.

One or more rules are applied to the characteristic information and operational history information retrieved for the physical storage devices of a mirrored logical volume to which a Read I/O operation is directed. These rules may further take into consideration parameters associated with the Read I/O operation, e.g., an amount of data that is to be read, and the like. The application of these rules results in a selection of a physical storage device from which the data should be read to optimize the processing of the Read I/O operation.

The rules that may be applied to the characteristic information and operational history information may take many different forms and it is not possible to cover all of the possible rules that may be used with the present invention within this disclosure. Examples of such rules include determining the fastest physical storage device based on RPM speed, connection type, and whether a write cache or read-ahead cache is utilized. Other rules may be based on reliability as determined from the time in service and failure history. Moreover, a combination of such speed and reliability rules may be utilized. Thus, for example, the fastest physical storage device may be selected as determined from a first set of rules as long as the reliability of the fastest physical storage device is determined to be satisfactory based on the results of a second set of rules.

Furthermore, the rules may be based on parameters associated with the Read I/O operation that is requested. For example, if the Read I/O operation requires a relatively large amount of data to be read, determined based on an established threshold, then a more reliable storage device may be more desirable even though it may not be the fastest storage device from which to read the data. However, if a relatively small amount of data is to be read, a faster storage device may be more desirable even though it may not be as reliable.

The application of these rules may further be used in conjunction with other known selection algorithms. For example, known selection algorithms include a round-robin selection algorithm, a least busy selection algorithm, and a closest physical location of the read head selection algorithm. Thus, the last mirror from which a Read I/O operation was performed, the least busy physical storage device, and the physical storage device having a closest physical location of the read head to the desired physical partition and logical block may all be included as factors, e.g., characteristic information, used in the decision process performed by the rules of the present invention.

As an example of the application of rules to the characteristic and operational history information, consider an exemplary scenario in which a Read I/O operation request comes down to the mirroring device driver 650 and that the Read I/O request is requesting a large block of contiguous data to be read from a mirror. The storage system 670 has 10 physical storage devices that are acting as mirrors. Also assume that all physical storage devices are equally busy such that the only difference between the physical storage devices is their characteristic information and operational history information.

In this particular example it is assumed that 2 of the 10 physical storage devices that act as mirrors have been noted in their characteristic information as having read-ahead caches. In addition, one of the 2 physical storage devices has a slightly higher RPM speed than the other. Thus, applying rules to this information would result in the large Read I/O operation being sent to the physical storage device with the read-ahead cache that has the faster RPM speed. However, if this physical storage device has a relatively low reliability as compared to the other of the 2 physical storage devices, or if this physical storage device was the last one to which a Read I/O operation was sent, or if the other of the 2 physical storage devices has a read head closer to the desired physical partition and logical block, then the other of the 2 physical storage devices may be selected as the optimum physical storage device from which to read the data. Thus, a balance between operational ability and operational reliability may be achieved along with consideration of previous and current situations of the physical storage devices through the use of the rule based decision making of the mirroring device driver 650 of the logical volume manager 630.

Figure 7:
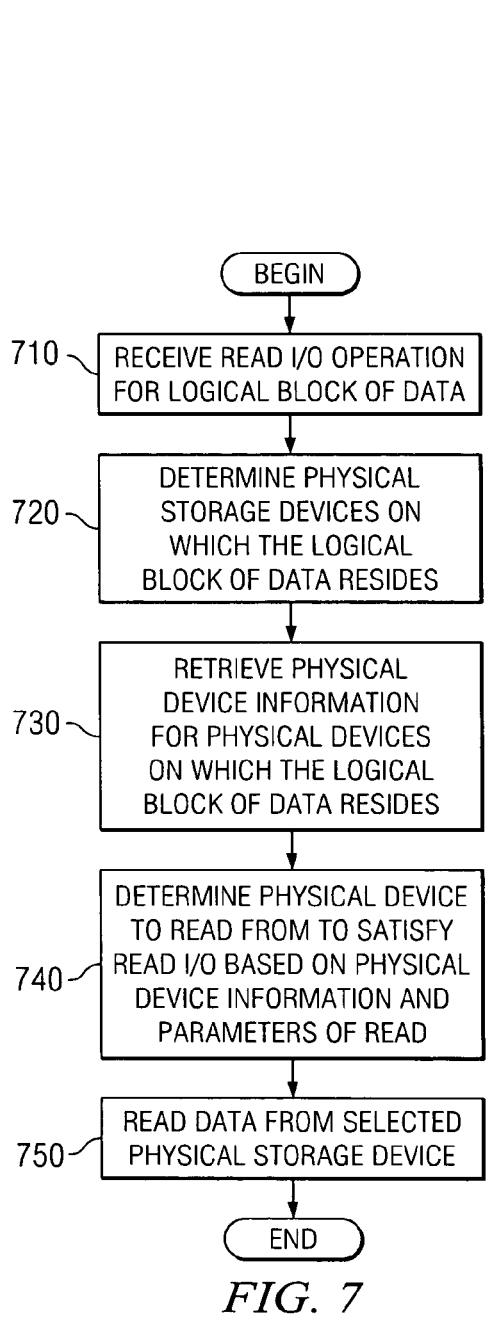
FIG. 7 is a flowchart outlining an exemplary operation for processing a Read request in accordance with the present invention.
Figure 8:
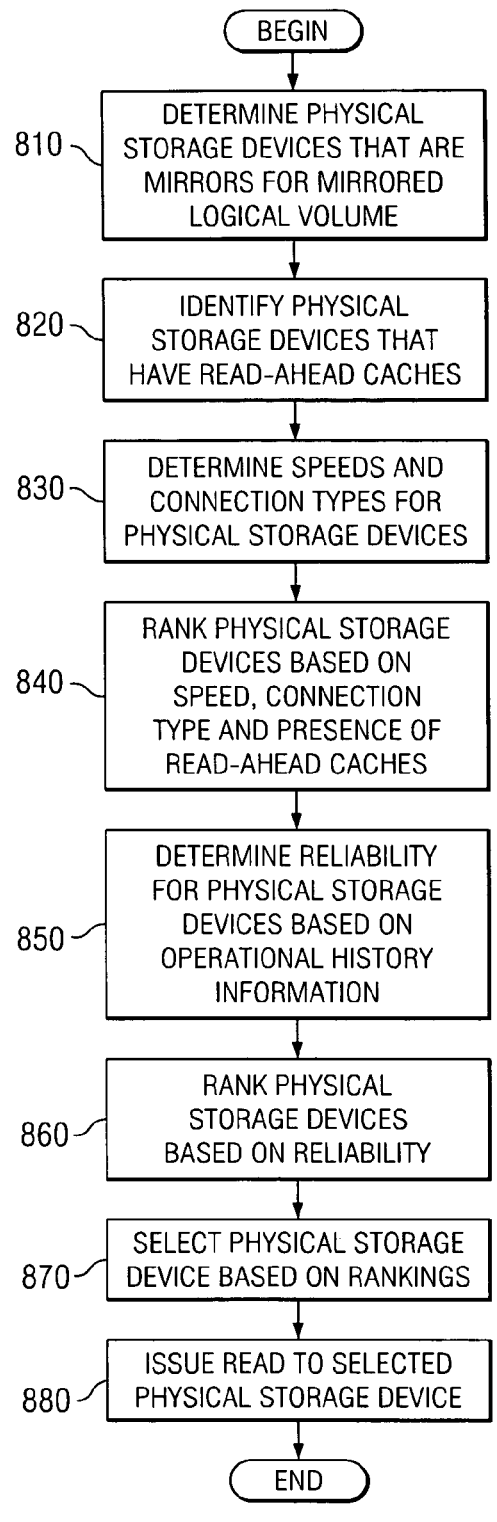
FIG. 8 is a flowchart outlining an exemplary operation of the present invention for applying rules to identify an optimum physical storage device from which data is to be read.

FIGS. 7 and 8 are flowcharts that illustrate operations for processing a Read I/O operation according to the invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

While the following flowcharts will be described in terms of the logical volume manager performing the operations of the flowcharts, this is only exemplary. Other configurations of host systems and storage systems may require other operational elements to perform these operations other than a logical volume manager and these other configurations are intended to be within the spirit and scope of the present invention. Moreover, the logical volume manager referred to in the following description may enlist the aide of a logical volume device driver and/or a mirroring device driver, as illustrated in FIG. 6, to perform some of the operations described in FIGS. 7 and 8.

FIG. 7 is a flowchart outlining an exemplary operation of the present invention when processing a Read I/O operation. As shown in FIG. 7, the operation begins with the LVM receiving a Read request to read a logical block of data (step 710). The LVM determines which physical storage devices on which the logical block of data resides, including mirror data storage devices, by determining the logical volume associated with the logical block of data and which storage devices associated with the logical volume store data in the address range in which the logical block of data falls (step 720).

The LVM then retrieves the characteristic information for the various physical storage devices that store the logical block of data (step 730). As previously described, this physical storage device characteristic information may include configuration parameters of the physical storage devices, e.g., whether the physical storage device includes a write cache, a read-ahead cache, the revolutions-per-minute of the physical storage device, the type of communication connection used by the physical storage device (e.g., USB, firewire, fibrechannel, etc.), and the like. In addition, the physical device information may further include historical operational parameters including the amount of time the physical device has been in service, a failure history log, and the like.

Once the physical device information is retrieved, the LVM determines which physical device to read from to satisfy the Read I/O operation (step 740). As previously described, this operation may involve applying one or more selection rules to the physical device information taking into account parameters of the Read operation received, e.g., the amount of data being read. FIG. 8 provides an exemplary operation for determining which physical device to read the data from based on the retrieved physical device information and parameters of the Read I/O operation.

It should be noted that the user may also designate the set of rules or ranking mechanisms that the logical volume manager of the present invention uses to determine the preferred storage device from which to read the data based on valid parameters that the user allows. This allows the user to set the rules and ranking mechanisms according to their best judgment or personal preference of which storage devices should be favored in the determination of where a Read I/O should be directed.

The LVM then reads the data for the I/O operation from the selected physical storage device and provides the data to the operating system (step 750). The operation then terminates. This operation may be repeated for each Read I/O operation.

FIG. 8 is a flowchart outlining an exemplary operation of the present invention when determining which of a plurality of physical storage devices to read data from in a mirrored logical volume. As shown in FIG. 8, the operation starts by identifying the physical storage devices that act as mirrors for the mirrored logical volume to which the Read I/O operation is directed (step 810). The physical storage devices that have read-ahead caches, as identified by their characteristic information, are identified (step 820). The speeds and connection types of all of the physical storage devices that act as mirrors for this mirrored logical volume are identified (step 830). These physical storage devices are then ranked first based on speed, then based on connection type, e.g., firewire connections are ranked higher than USB connections, etc., and then based on whether or not they have a read-ahead cache (step 840).

For example, if a first physical storage device runs at 1500 RPMs and second physical storage device runs at 1800 RMPS, the second physical storage device is ranked higher than the first physical storage device. However, if the first physical storage device has a firewire connection and the second physical storage device has a USB connection, then the first physical storage device may be ranked higher than the second physical storage device. Moreover, if the first physical storage device is ranked higher than the second physical storage device, but the second physical storage devices has a read-ahead cache, then the physical storage device may be ranked higher than the first physical storage device.

After having ranked the physical storage devices, the operational history information for these physical storage devices are considered. That is, the reliability of the physical storage devices is determined based on time in service and their failure history (step 850). The physical storage devices are then ranked based on their reliability (step 860).

For example, those physical storage devices that have been in service the longest and have relatively few failures will be ranked higher than those that have been in service the least amount of time or those that have relatively high number of failures. A separately ranked list of the physical storage devices may be maintained apart from the list of physical storage devices ranked by operational characteristics.

Based on these two ranked lists, an optimum physical storage device from which to perform the Read I/O operation is determined based on the size of the Read I/O operation, i.e. the amount of data being read (step 870). If a large amount of data is to be read, the physical storage device that has the highest rank in both of the ranked lists may be selected, or the highest ranked physical storage device in the second list, i.e. the list ranked by reliability, may be selected. If a small amount of data is to be read, the physical storage device that has the highest rank in only the first ranked list, i.e. the list ranked on operational characteristics, may be selected.

The Read I/O operation is then sent to the selected physical storage device (step 880) such that the required data is read from the selected physical storage device. The steps described above may be performed by the application of one or more rules to the data retrieved from the physical storage device information data structure as previously discussed above. These rules may be stored in association with a device driver associated with a logical volume manager. In a preferred embodiment, the device driver is a mirroring device driver associated with, or incorporated into, a logical volume device driver utilized by a logical volume manager.

Those of ordinary skill in the art will appreciate that FIG. 8 is only exemplary and no limitations on the types of rules or ranking operations that may be performed by the present invention are intended or should be inferred from the description of FIG. 8. Many types of rules and rankings may be performed without departing from the spirit and scope of the present invention.

Thus, the present invention provides a system and method for improving the processing of Read operations to a mirrored logical volume. The present invention allows different physical storage devices to be utilized in mirrors of a logical volume and allows the differences between these physical storage devices to be considered during processing of Read I/O operations to the mirrored logical volume. As a result, the present invention is able to take advantage of the characteristics of each physical storage device and its operational history to determine the optimum physical storage device from which the data requested in the Read I/O operation should be read.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of reading data from a mirrored logical volume, comprising:

receiving a read request directed to a mirrored logical volume;

retrieving characteristic information for each of a plurality of physical devices associated with mirrors of the mirrored logical volume, wherein the characteristic information identifies a particular characteristic of a physical storage device itself and wherein the characteristic information distinguishes between different types of physical storage devices in the plurality of physical storage devices, and wherein the characteristic information includes at least one of whether a corresponding physical storage device includes a write cache, whether a corresponding physical storage device includes a read-ahead cache, a speed of a corresponding physical storage device, and a connection type of a corresponding physical storage device;

applying one or more rules to the characteristic information to select a physical storage device from the plurality of physical storage devices to which the read request is to be directed; and reading the data from the selected physical storage device.

2. The method of claim 1, wherein the characteristic information further includes operational history information.

3. The method of claim 1, wherein the characteristic information is stored in a physical storage device information data structure associated with a storage subsystem.

4. The method of claim 1, wherein the characteristic information is stored in a physical storage device information data structure associated with a logical volume manager.

5. The method of claim 1, wherein the characteristic information is stored in a data structure generated during initiation of a logical volume.

6. The method of claim 5, wherein the characteristic information is automatically obtained by querying the physical storage devices in the plurality of physical storage devices during initiation of the logical volume.

7. The method of claim 5, wherein the characteristic information is obtained from user input during initiation of the logical volume.

8. The method of claim 1, wherein the method is performed by a logical volume manager.

9. A method of reading data from a mirrored logical volume, comprising:
  receiving a read request directed to a mirrored logical volume;
  retrieving characteristic information for each of a plurality of physical storage devices associated with mirrors of the mirrored logical volume;
  wherein the characteristic information includes at least one of whether a corresponding physical storage device includes a write cache, whether a corresponding physical storage device includes a read-ahead cache, a speed of a corresponding physical storage device, and a connection type of a corresponding physical storage device;
  wherein the characteristic information further includes operational history information, and wherein the operational history information includes at least one of an amount of time that a corresponding physical storage device has been in service and a failure history of a corresponding physical storage device;
  applying one or more rules to the characteristic information to select a physical storage device from the plurality of physical storage devices to which the read request is to be directed; and
  reading the data from the selected physical storage device.

10. A computer program product in a computer readable medium for reading data from a mirrored logical volume, comprising:
  first instructions for receiving a read request directed to a mirrored logical volume;
  second instructions for retrieving characteristic information for each of a plurality of physical storage devices associated with mirrors of the mirrored logical volume, wherein the characteristic information identifies a particular characteristic of a physical storage device itself and wherein the characteristic information distinguishes between different types of physical storage devices in the plurality of physical storage devices, and wherein the characteristic information includes at least one of whether a corresponding physical storage device includes a write cache, whether a corresponding physical storage device includes a read-ahead cache, a speed of a corresponding physical storage device, and a connection type of a corresponding physical storage device;
  third instructions for applying one or more rules to the characteristic information to select a physical storage device from the plurality of physical storage devices to which the read request is to be directed; and
  fourth instructions for reading the data from the selected physical storage device.

11. The computer program product of claim 10, wherein the characteristic information further includes operational history information.

12. The computer program product of claim 10, wherein the characteristic information is stored in a physical storage device information data structure associated with a storage subsystem.

13. The computer program product of claim 10, wherein the characteristic information is stored in a physical storage device information data structure associated with a logical volume manager.

14. The computer program product of claim 10, wherein the characteristic information is stored in a data structure generated during initiation of a logical volume.

15. The computer program product of claim 14, wherein the characteristic information is automatically obtained by querying the physical storage devices in the plurality of physical storage devices during initiation of the logical volume.

16. The computer program product of claim 14, wherein the characteristic information is obtained from user input during initiation of the logical volume.

17. The computer program product of claim 10, wherein the computer program product is part of a logical volume manager.

18. A computer program product in a computer readable medium for reading data from a mirrored logical volume, comprising:
  first instructions for receiving a read request directed to a mirrored logical volume;
  second instructions for retrieving characteristic information for each of a plurality of physical storage devices associated with mirrors of the mirrored logical volume;
  wherein the characteristic information includes at least one of whether a corresponding physical storage device includes a write cache, whether a corresponding physical storage device includes a read-ahead cache, a speed of a corresponding physical storage device, and a connection type of a corresponding physical storage device;
  wherein the characteristic information further includes operational history information, and wherein the operational history information includes at least one of an amount of time that a corresponding physical storage device has been in service and a failure history of a corresponding physical storage device;
  third instructions for applying one or more rules to the characteristic information to select a physical storage device from the plurality of physical storage devices to which the read request is to be directed; and
  fourth instructions for reading the data from the selected physical storage device.

19. An apparatus for reading data from a mirrored logical volume, comprising:
  means for receiving a read request directed to a mirrored logical volume;
  means for retrieving characteristic information for each of a plurality of physical storage devices associated with mirrors of the mirrored logical volume, wherein the characteristic information identifies a particular characteristic of a physical storage device itself, and wherein the characteristic information distinguishes between different types of physical storage devices in the plurality of physical storage devices, and wherein the characteristic information includes at least one of whether a corresponding physical storage device includes a write cache, whether a corresponding physical storage device includes a read-ahead cache, a speed of a corresponding physical storage device, and a connection type of a corresponding physical storage device;

means for applying one or more rules to the characteristic information to selcet a physical storage device from the plurality of physical storage devices to which the read request is to be directed; and means for reading the data from the selected physical storage device.

20. A method, in a data processing system, for selecting a storage device from which to read data, comprising:

storing information into a user input database, wherein the information identifies physical characteristics of at least one storage device itself, and wherein the information distinguishes between the at least one storage device and different storage devices in a plurality of storage devices, and wherein the information includes at least one of whether a corresponding storage device includes a write cache, whether a corresponding storage device includes a read-ahead cache, a speed of a corresponding storage device, and a connection type of a corresponding storage device;

reading by a device driver, upon mirror activation and initialization, the information for the at least one storage device in the user input database; and selecting an optimal storage device to send a read request to based upon the information for the at least one storage device read from the user input database.

21. The method of claim 20, wherein the information further includes operational history information.

22. The method of claim 20, wherein the information is stored in a storage device information data structure associated with a storage subsystem.

23. The method of claim 20, wherein the information is stored in a storage device information data structure associated with a logical volume manager.

24. The method of claim 20, wherein the information is stored in a data structure generated during initiation of a logical volume.

25. The method of claim 24, wherein the information is automatically obtained by querying the physical storage devices in the plurality of physical storage devices during initiation of the logical volume.

26. The method of claim 24, wherein the information is obtained from user input during initiation of the logical volume.

27. A method, in a data processing system, for selecting a storage device from which to read data, comprising:

storing information into a user input database, wherein the information identifies characteristics of at least one storage device;

wherein the information includes at least one of whether a corresponding storage device includes a write cache, whether a corresponding storage device includes a read-ahead cache, a speed of a corresponding storage devices, and a connection type of a corresponding storage device;

wherein the information further includes operational history information, and wherein the operational history information includes at least one of an amount of time that a corresponding storage device has been in service and a failure history of a corresponding storage device;

reading, by a device driver, upon mirror activation and initialization, the information for the at least one storage device in the user input database; and selecting an optimal storage device to send a read request to based upon the information for the at least one storage device read from the user input database.

* * * * *